United States Patent [19]

Minke

[11] 4,157,063
[45] Jun. 5, 1979

[54] METHOD OF AND APPARATUS FOR ARRANGING TWINE AROUND A BALE

[75] Inventor: Gerhardus Minke, Appingedam, Netherlands

[73] Assignee: Ter Borg & Mensinga's Machinefabrief N.V., Appingedam, Netherlands

[21] Appl. No.: 917,208

[22] Filed: Jun. 20, 1978

[30] Foreign Application Priority Data

Jun. 21, 1977 [NL] Netherlands .......................... 7706863

[51] Int. Cl.² ............................................ B65B 13/02
[52] U.S. Cl. ........................................ 100/3; 100/11; 100/17; 289/2
[58] Field of Search .................... 100/3, 11, 17, 18, 19, 100/21, 31, 33; 289/2

[56] References Cited

U.S. PATENT DOCUMENTS

| | | | |
|---|---|---|---|
| 2,610,573 | 9/1952 | Altgelt | 100/31 X |
| 2,777,384 | 1/1957 | Nolt | 100/11 |
| 2,963,958 | 12/1960 | Nelson | 100/11 |
| 3,099,203 | 7/1963 | Klemm | 100/19 R |
| 3,789,751 | 2/1974 | Burford | 100/19 R |
| 4,074,623 | 2/1978 | White | 100/3 |

FOREIGN PATENT DOCUMENTS 1016781 1/1966 United Kingdom ...................... 100/11

Primary Examiner—Billy J. Wilhite
Attorney, Agent, or Firm—Wilkinson, Mawhinney & Theibault

[57] ABSTRACT

A method of arranging twine around a bale of straw or hay formed by pressing in a baling machine in which twine is fed from two separate bobbins, and, while pressure on the bale is maintained, one knot is laid in both pieces of twine for tying off the bale and another knot as starting knot for a following bale. The time periods of the formation of the knots overlap. The knots formed are noose type knots. The knots are formed under substantially no tension, so that the bales can be pressed with a considerable pressure, and a resulting increased density, without affecting the process of forming the knots or the firmness and stability of formed knots.

Apparatus for binding bales in a baling machine comprising means for supplying twine for each twine loop, from two separate bobbins, and first and second rotary driven knotters. Preferably the axes of the knotters are located on opposite sides of a common plane in which the pieces of twine are supplied and the centerlines of the knotters are in radial direction with respect to a common knotter drive spindle, and they are driven by a pair of discs each provided with a toothed sector.

17 Claims, 12 Drawing Figures

Fig. 5.

METHOD OF AND APPARATUS FOR ARRANGING TWINE AROUND A BALE

BACKGROUND OF THE INVENTION

The invention relates to a method of arranging twine around a bale of, for instance, straw or hay formed by pressing in a baling machine, including tying the twine off by knotting it.

The invention relates furthermore to apparatus for carrying out the method, made up of knotting apparatus which can be combined with a baling machine.

A method and an apparatus have been commonly known, particularly in agriculture, since the thirties, in which the bale is formed in a bale chamber against a piece of twine extending through the chamber and, after completion of the bale, a needle performs a reciprocating movement across the back of the bale and through the press plunger so as to surround the bale with twine, after which the twine, while the pressure is still maintained, is tied off. The work is done with a piece of twine coming from one single bobbin. After enclosing the bale, a knot is made by means of a knotting apparatus which comprises a so-called retainer as an essential part. The use of retainers entails a number of disadvantages and sensitivities. In the course of time, various improvements in regard to details have been proposed, but in principle the way in which the retainers work has not been changed in comparison with the original design. Since in these known retainers the twine to be knotted is clamped between the plates, a number of sensitivities arise, most of which are conductive to the untimely slipping of the twine out of the retainer. In the first place, it is evident that there exists a sensitivity to the thickness of the twine used but, therefore in the second place, also to variations in the thickness such as may occur particularly with flax twine. However, the thickness alone is not decisive, for the kind of twine is also of influence on the grip the retainer has on the twine. Thus twine of natural fibres has a better internal cohesion than twine made of plastics material; there are, for instance, several kinds of polypropylene twine in the market, on the one hand in the shape of fibres and, on the other hand, in the shape of twisted foil, but either kind has the disadvantage that the elements of the twine, particularly in the interior of the twine, can easily slip along each other, as a result of which the retainer may lose its grip on the twine. Furthermore, the retainer is sensitive to pollution bur moreover to wear of the various parts of the retainer itself. Further, there occurs, of course, wear in the parts of the retainer rotating with respect to each other.

Given these sensitivities and problems, work could nevertheless be done reasonably well in actual practice provided measures were taken to ensure that the tension in the twine remained limited. This entailed at least a limitation in the compressive force. As an indication may be mentioned that up to now, with optimum adjustment of the retainer, it was not possible in baling presses to exceed 130 kg/m$^3$ for hay.

Advantages may be achieved by bringing heavier pressures to bear. On the one hand, there is, of course, the aspect of the storage capacity for a certain quantity by weight, but on the other hand there is the very important factor of the cost of transport. The said value of 130 kg/m$^3$ usually implies that a lorry will have a maximum load by volume whereas its load by weight at that moment is in the vicinity of half the admissible value only. In the ideal case it would be possible to convey twice that quantity of material provided it could be compressed to one half.

Apart from these problems and sensitivities of the retainer, raising the pressure meets with still another problem. The twine is displaced between the bale which has just been tied off and the bale to be newly formed. Each stroke of the pressing plunger implies a tug to the twine which is kept between the flakes (successively pressed portions) and the retainer. When the compression is increased these tugs become more intense and the likelihood of the twine being stresses to break or of its being drawn out of the retainer increases. The increase in this likelihood is more than proportional above a certain limit.

One of the solutions is binding with wire, generally iron wire, whether or not galvanized. This has a greater tensile strength than twine. The application of wire has been known as such at least as long as binding with twine. However, there are again some specific disadvantages connected therewith which have meant that, in some countries anyhow, the use of strapping wire has been abandoned in the domain of agriculture. One of the disadvantages is the formation of rust, but the most important is the risk of pieces of iron wire getting between the fodder which, as is known, may cause the cattle to die as a consequence of gastric or intestinal perforations. Apart from this, there is still a limit to the compression rate when iron wire is used. The extreme ends of the wire are twisted and the twist will loosen when the bale compression becomes too high.

The principle object of the invention therefore is to provide a method and apparatus with which it is possible, while making use of twine (whether of natural or of plastics fibres) to raise the admissible pressure considerably.

Another important object to provide this in such manner that during the process of bale forming and surrounding it with twine and tying it off there is no tension in the twine related to the pressure extended on the bale which is being formed.

A further object is to eliminate the need for the conventional retainer.

A still further object is to reduce as far as possible the time required for tying off the bale.

SUMMARY OF THE INVENTION

The present invention provides a method of arranging twine around a bale formed by pressing in the bale chamber of a baling machine by means of a press plunger, in which twine is fed from two separate bobbins, a starting knot is laid between the twine ends and the twine is arranged in the bale chamber so as to extend across the front of the bale remote from the press plunger, the bale is pressed and the twine is drawn from the bobbins during pressing so that one piece of twine comes to lie along one longitudinal side of the bale and another piece comes to lie along the opposite longitudinal side, after completion of the bale one of the said pieces of twine is carried across the back of the bale by means of a needle which performs a reciprocating movement across the back of the bale through the press plunger, and, while pressure is maintained by the press plunger, two knots are laid in both pieces of twine, one knot for tying off the bale and another knot as a starting knot for a following bale, the time period of the formation of the said other knot until its completion overlapping the time period of the formation of the said one knot until completion thereof.

In that twine is supplied from two bobbins opposite longitudinal sides (e.g. top and bottom) of the bale, there is no longer any need for the twine to be drawn between the bales formed, so that on that account there is no longer any tension. Moreover, however, this working principle, in which the work is done with two pieces of twine and in which, therefore, two knots are laid, offers the possibility of carrying out the knotting itself entirely tension-free, irrespective of the pressure brought to bear by the plunger on the bale. In consequence, a retainer is redundant and two knotter bits each of which in itself may be a known type (e.g. so-called Appleby knotter bits) will suffice. All the disadvantages summarized above concerning the retainer of the known system are, of course, hereby eliminated. The improvement which can be achieved is so fundamental that, whereas formerly the admissible pressure was determined by the cooperation between the twine and the retainer, it has now been achieved that the admitted upper limit for the pressure is determined exclusively by the properties of the press (the bale chamber and the pressing plunger) and by the strength of the twine itself. The knotting mechanism does not impose limits to the compression which can be applied. As long as use is made of twine of a sufficient strength it has now already been possible, using otherwise unaltered baling presses, to press up to about 200 kg/m$^3$.

The time periods of the formation of the knots are overlapping. It is not necessary for the knotters to function exactly in synchronism so that the various stages of the formation of the knot would take place precisely simultaneously, but it is advantageous to make the one knotter operative while the other is still inoperative. This will reduce the time required for tying the bale off, but moreover eliminates the need for any other holding means for the twines between the making of the two knots.

The invention also provides apparatus for use in the method described above, for arranging twine around a bale formed by pressing in the bale chamber of a baling machine by means of a press plunger, said baling machine comprising means for supplying two pieces of twine from separate bobbins, the apparatus comprising first and second rotary driven knotters.

Preferably the axes of the knotters are located on opposite sides of a common plane of supply of the pieces of twine and are spaced apart in a direction parallel to this plane, the knotters having respective knotter bits which, when in their rest positions, at the beginning and end of each knotting cycle, are directed substantially towards the said common plane. This keeps the forces which are exerted on the needle substantially symmetrical and prevents bending of the needle as well as possible frictional engagement against the apparatus.

The two knotters will be driven by preference from a common drive, particularly with a view to synchronization of the various steps. A very simple solution for this is obtained in an embodiment which is characterized in that the centre lines of the two knotters are radially disposed with respect to a common knotter drive spindle.

In connection herewith it is pointed out that loop shaped knots or noose knots are being made; it appears from investigations that, particularly when polypropylene twine is used, a noos type of knot is stronger than knots in which the free end has been pulled through.

The invention furthermore provides the above-described knotting apparatus in combination with a baling machine having a bale chamber, a press plunger, and a needle arranged to perform a reciprocating movement through the press plunger and between the two knotters.

Using the method according to the invention one will generally proceed in the known manner according to which several twine loops are strapped around each bale. In agriculture usually two twine loops are used, but it is also possible to build larger balers with which it is desirable to lay simultaneously three loops for tying off. Then, of course, two or three appratuses of the invention are provided. The knotters of these apparatuses are then all driven by the same central knotter drive spindle.

The invention will be clarified with reference to the accompanying drawings of an apparatus representing the best mode known to applicant of realizing the invention.

BRIEF DESCRIPTION OF THE DRAWINGS

FIGS. 1 to 3 are schematic elevations of vertical sections according to the longitudinal direction of the bale chamber in a baling machine;

DETAILED DESCRIPTION OF THE PREFERRED EMBODIMENT

Figure 1:
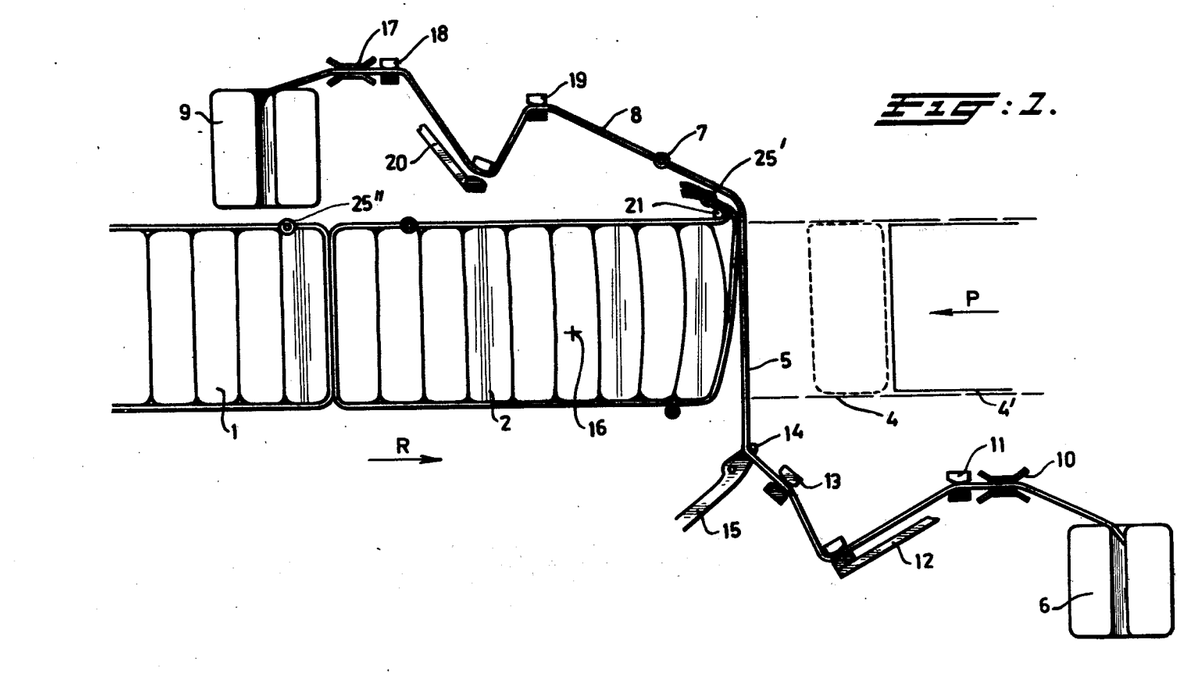
Figure 2:
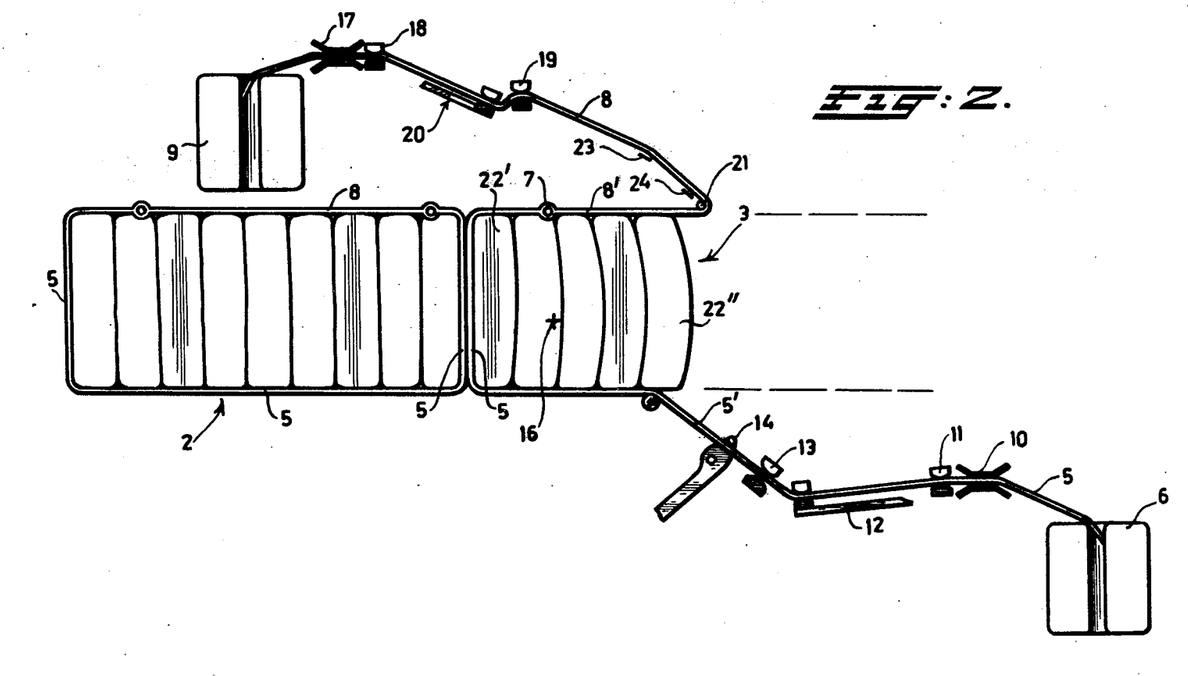

FIGS. 1 to 3 are vertical sectional views according to the longitudinal direction of the baling chamber. The direction of travel of the machine is indicated in FIG. 1 by the arrow P. With respect to this direction of travel the left side will therefore be the front and the right side the rear.

In the bale chamber 4, schematically indicated, a so-called press plunger 4' moves to and fro in a known manner. After a forward stroke, a quantity of material to be pressed, such as straw or hay, can be fed into the chamber, and in a rearward stroke of the press (indicated by the arrow P in FIG. 1) this is compressed till the number of so-called flakes thus pressed is sufficiently large and can be tied off to form a bale. All of this does not differ from the known baling machines, so that detailed description or detailed illustration in the drawing has been left out.

The start of a press cycle is illustrated in FIG. 1. A lower twine 5 is taken from a lower bobbin 6. By a knot 7 it is tied to an upper twine 8 which originates from an upper bobbin 9. The lower twine runs through a twine tensioner 10 by which, in a known manner, the small tension in the wound-off twine can be adjusted. Then it runs through a twine-guiding ring or eye 11, past a twine tensioner 12 in form of a ring which is located at the end of a resilient lever by which in known manner shocks in the velocity of winding-off can be absorbed, subsequently through a ring 13 which, like the ring 11, is fixedly arranged, and then through the eye 14 which is located in the end of a needle 15. Also the needle does not differ substantially from the known needles, so that it is only automatically represented, the axis of rotation of the needle being indicated by 16. In a similar manner the upper twine passes through a clamp 17, the rings 18 and 19, and a resilient twine tensioner 20.

As will be made clear, the knot 7 between the lower and the upper twine is made by itself at the end of a cycle, so that the machine is then ready to start another cycle. When the press has to operate for the first time, the knot between the two pieces of twine has to be made by hand, the pieces of twine having, of course, to be spanned through the interior of the machine in the manner sketched in FIG. 1, the lower twine 5 particularly having to be drawn from the eye in the needle 14 almost vertically upwards, being guided over a pin 21.

In this situation the press is put into operation and a number of flakes of material to be pressed are urged rearward against the twine 5. FIG. 2 illustrates a subsequent stage in which five of such flakes 22'-22" have been pressed. At each pressing stroke P the foregoing bale, such as 2, is pushed further rearward. From FIG. 2 it may be seen that the flakes 22'-22" are pressed against the lower twine 5, that thereby the knot 7 is positioned against the top of the bale formed and that, at the same time, lengths of twine 5' and 8' are drawn from the respective bobbins without it being necessary for the initial piece of twine 5 to carry out any displacement with respect to the material pressed. The sole tension existing in the twine is that caused by the two twine clamps 10 and 17.

Moreover, between the pin 21 and the ring 19 the upper twine 8 runs via two knotter bits 23 and 24 the functioning of which will be described later.

There is provided a known mechanism (not shown) which measures the length of the bale formed. This mechanism may for instance, comprise a cog wheel which runs along the bale formed and which after a complete revolution, corresponding to a fixed bale length, puts the knotter mechanism into operation via a lever. FIG. 3 shows the stage at which, with a ninth flake 22''', this fixed bale length has been reached. In the meantime, the needle 15 has already swung upwards around its axis of rotation 16. This means that knotting has commenced. It will be apparent that a knotting cycle, at the end of each pressing cycle, takes only a fraction of the time of a pressing cycle. When swinging upwardly the needle 15 takes along, of course, the lower twine because this has been put through the eye 14. The upward swing of the needle takes place while the press plunger holds the last flake 22''', so the complete bale is under compression. The displacement of the needle along the rear of the bale now to be tied off is allowed in that the press plunger is provided at that location with a slot which lets the needle 15 through. This is already known in baling machines.

As a result of the upward stroke of the needle 15 a part 5'' of the lower twine called bale-enclosing twine, is placed along the front of the bale formed and the twine is put alongside the upper twine 8 via the two knotter heads 23, 24 at which time the connection 5''' of the lower twine and the bobbin is maintained.

In a manner to be described below, each of the knotter bits 23, 24 makes a knot in both pieces of twine - lower twine and upper twine jointly. Both pieces of twine are cut through the knotter bits 23, 24 and then a pressing cycle is again almost completed. The lower knotter bit 24 will make a knot 25, thus completing the strapping of the bale formed, and this knot 25 may be seen again in FIG. 1 where it is indicated by 25' for the foregoing bale 2, and by 25" for the preceding bale 1. The upper knotterbit 23 in FIG. 3 makes a knot which in FIG. 3 is indicated by 7' and which corresponds with the knot 7 of FIG. 1, i.e. it is the initial knot between the upper and lower twine for the start of the following press cycle. The last movement by which the phase of FIG. 3 is brought definitively in the final phase corresponding with the initial phase of FIG. 1 is the return movement of the needle 15 which, in doing so, has its eye simply pass along the lower twine part 5'''; because at 7' this has been tied to the upper twine, it will be clear that the part 5''' of the lower twine as shown in FIG. 3 will remain in about the same place and that it will for the next bale, perform the function described for the piece of twine 5 with reference to FIG. 1.

Figures 4, 4A:
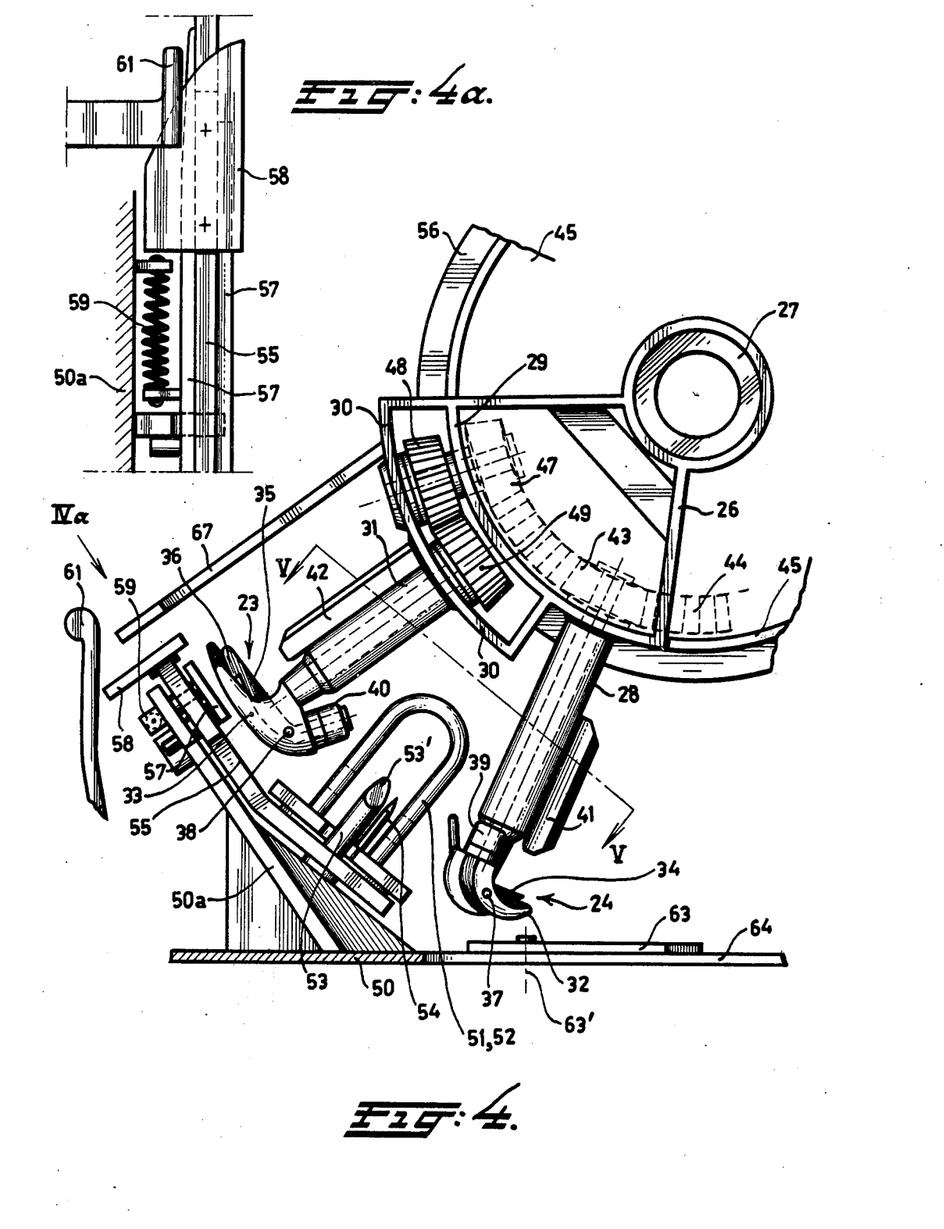
FIG. 4 shows a knotting apparatus in a similar section and in further detail.
FIG. 4a shows a detail as viewed according to the arrow IVa in FIG. 4.

FIG. 4 is a schematic elevation of the knotter mechanism as a sectional view perpendicular to the centreline of the so-called central knotter spindle. This is in a vertical plane so that both knotters are seen in the same view as in FIGS. 1 to 3, but now in more detail, be it still schematic.

The central knotter spindle is located substantially in the same place as the knotter spindle of the known machine which worked with a retainer and one twine bobbin. The knotter machine proper differs, as will be evident, fundamentally from the prior art mechanism driven by the knotter spindle.

In FIG. 4, the two knotters are shown, the knotter bits (or knotter heads) of which are indicated as a whole by 23 and 24. A circular-sector-shaped frame 26 is immobile relative to the rotary knotter spindle 27 which provides the drive. A bearing tube 28 for the lower knotter-bit 24 extends in a radial direction and is integral with the element 29 of the frame 26 which extends according to the peripheral direction. Concentrically thereto extends another frame portion 30 which bears a similar radially extending but somewhat shorter bearer tube 31 for the upper knotterbit 23. In the embodiment described the value of the radial angle between the directions of the bearer tubes 28 and 29 for the knotter bits has been chosen as 30°.

Each of the knotterbits is pivotable because it is borne by a spindle which is located in the interior of the bearing tube 28, 31 respectively.

At the lower ends of these spindles there are arranged as integral parts the lower lips 32, 33 for the knotter bits.

The upper lips 34, 35 each of which is provided with a tooth such as 36 for holding the twine, are pivotable around spindles 37, 38 perpendicular to the axial direction of the bearing tube. The upward opening of these upper lips occurs in a known manner by small rollers 39, 40 arranged on the heel and running on suitable shaped circumferential cams 41, 43 on the outside of the bearing tube 28, 31 respectively.

At the lower ends of these spindles there are arranged as integral parts the lower lips 32, 33 for the knotterbits.

The upper lips 34, 35 each of which is provided with a tooth such as 36 for holding the twine, are pivotable around spindles 37, 38 perpendicular to the axial direction of the bearing tube. The upward opening of these upper lips occurs in a known manner by small rollers 39, 40 arranged on the heel and running on suitably shaped circumferential cams 41, 43 on the outside of the bearing tube 28, 31 respectively. Therefore, the opening or closing of the upper lip is determined entirely by the annular position. The rotary spindle of the lower knotter bit 24 bears a pinion 43 at its top which provides the rotary motion. This pinion 43 cooperates with a toothed segment 44 which is indicated in broken line and which has been provided over a suitable sector, on one side of a driving disc 45 arranged on the knotter spindle 27 and put into rotation thereby, this disc 45 also being indicated in broken line. A complete revolution of the knotter spindle 27 with the disc 45 corresponds with a knotting cycle, and the toothed segment 44 and the pinion 43 ensure that the lower knotter bit is driven during the correct part of this cycle for carrying out the knotting.

The knotter spindle 27 bears another disc also provided with a toothed segment which is directed towards the toothed segment 44 in dics 45. This second toothed segment (not shown) provides for the driving of a pinion 47 which, by means of two pinions 48,49 ensures the transmission to the rotary spindle of the upper knotter bit 23. This reversing transmission, starting from the two toothed segments being directed towards each other in the driving discs, results in the two knotterbits finally rotating in the same sense. In connection herewith it has to be noted that the centerlines of the knotterbits 23,24 do not lie in the same plane perpendicular to the knotter spindle 27, but that, due to these knotter spindles, the planes are a certain distance apart. This distance is visible in the schematic illustrations of FIGS. 5a–5f and is meant to let through the needle 15 which brings the lower twine to the knotters.

The knotter mechanism is arranged above the upper wall 50 of the bale chamber. Firmly connected therewith, there are arranged two U-shaped bows 51,52 which are positioned between the knotterbits 23 and 24. (In FIG. 4 only one of these bows is visible; the exact mutual relation is apparent again by comparison with FIGS. 5a–5f).

Inside or below these bows 51,52 there is a finger 53 for pulling a length of twine, and a twine-cutting knife 54. The top 53' of the twine-pulling finger 53 is finger-shaped, the end being directed backwards perpendicular to the plane of FIG. 4. The knife 54, which stands next to it, is slightly lower than the twine-pulling finger and the front of this knife, which is visible in FIG. 4, is the cutting edge. The parts 53,54 are mounted on a plate 55 the whole of which is movable in the plane perpendicular to the plane of FIG. 4 relative to a frame portion 50a which is fixedly connected with the plate 50; there is a lever transmission for the drive which, in a manner not shown here in further detail, is derived from a curved wheel 56 which also is arranged on the knotter spindle 27. Movement to and fro of the plate 55 with the parts borne thereby takes place in full coordination with the movement of the knotterbit because these parts perform a function in the making of the knots as will be further explained. The plate 55 is provided with an aperture which, with respect to a plate 57, forms a so-called twine lock the shape and function of which will be dealt with below, while on the left edge of the plate 55 there is arranged a twine catcher 58 in the form of a plate-shaped device. The shape of it will be apparent from FIG. 4a and the function of the twine catcher as well as of the twine lock will become apparent from the discussion of FIGS. 5a–5f, which are a series of highly schematized illustrations, being views according to the arrows V—V in FIG. 4.

OPERATION

Figure 5:
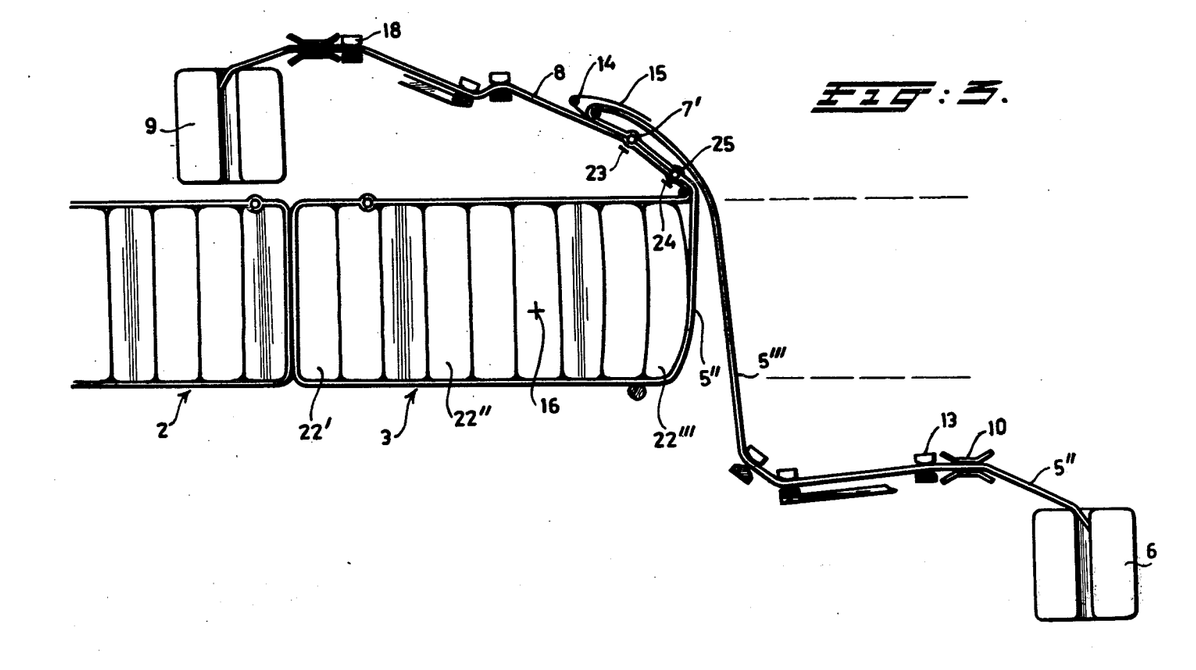
FIG. 5 is a time diagram of a complete knotting cycle.

FIG. 5 shows a time diagram in which for a complete knotting cycle, the most important functions of the knotting mechanism in its various parts have been represented. The numerals in the left hand column are the same as the reference numerals which are used for the various parts of the mechanism. As was stated above, the knotting cycle is only part of a press cycle.

Figure 5A:
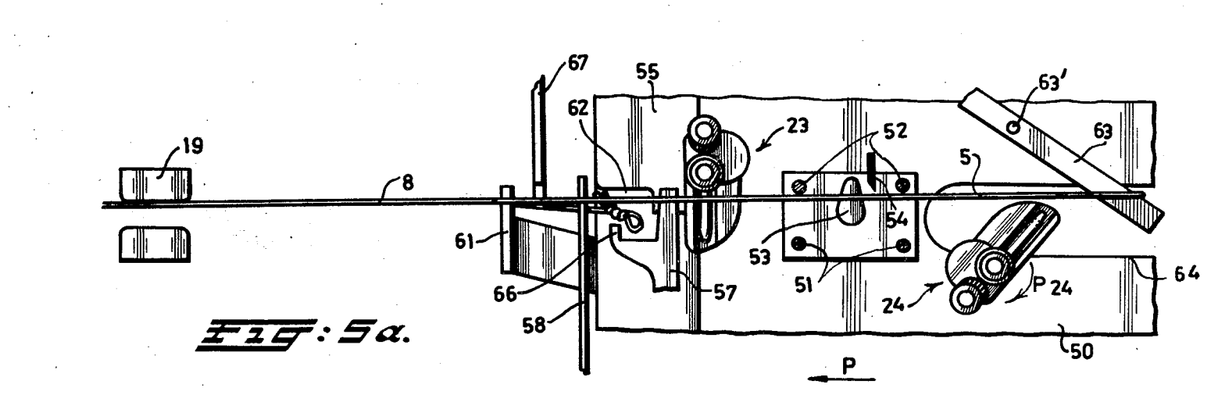
FIGS. 5a–5f show schematically various stages in a knotting cycle, being top views according to the arrows V—V in FIG. 4, each being taken at the moment in the cycle which is indicated in the time diagram of FIG. 5.

FIGS. 5a–5f show different stages of the knotting cycle. The moments in time of these different stages are indicated in FIG. 5 by the corresponding figure numbers. FIG. 5a shows the end of a knotting cycle, i.e. at 360° in FIG. 5. Although the position in the various parts of the knotting mechanism is the same as at the beginning of the next press cycle, this moment in time does not correspond to the moment in time of the start (0°) of the following knotting cycle. First a new bale has to be formed by pressing and not until the end of this pressing will tying off commence. The stage of FIG. 5a is at a moment in time which corresponds approximately with the moment represented in FIG. 1.

From the fixed twine eye 19 the upper twine 8 runs first across the fixed hook 61, (this hook 61 in this embodiment plays the role of the pin 21 in the diagrammatical representation of FIGS. 1–3) then across the twine catcher 58 so that it remains also free from the twine lock 62, then it runs across the upper knotterbit 23, between the bows 51,52 and across the lower knotterbit 24. The twine runs along the left U-shaped bow 52 (left with respect to the direction of travel which is here again from left to right). Between the bows 51,52 stand the twine pulling finger 53 and the knife 54 and at this stage also the upper twine 8 runs on top of it. The stripping plate 63 which is pivotal around the spindle 63' with respect to the plate 50, is in the stripping position and so it keeps the twine 8 at some distance above the lower knotterbit 24.

Figure 5B:
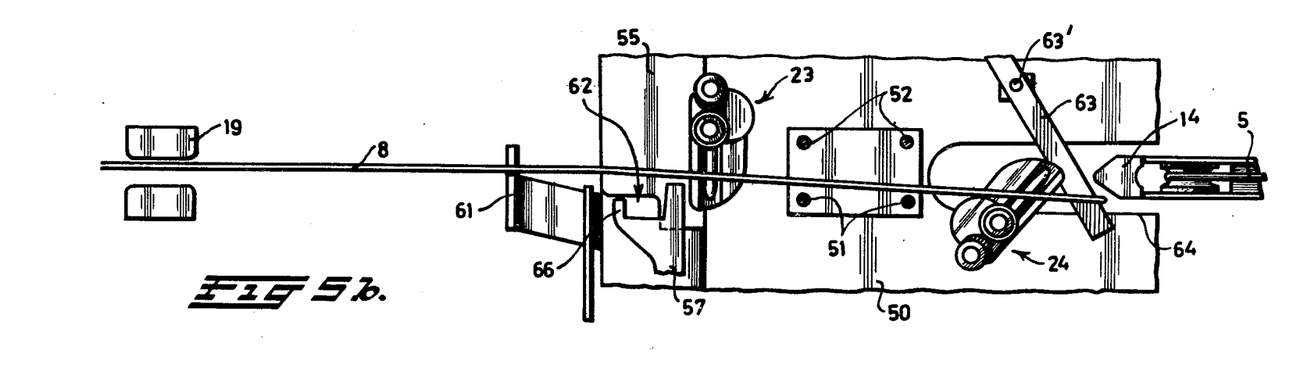

Starting from this stage and until the stage of FIG. 5b various things happen. The point 14 of the needle 15 is seen moving upward through the slot 64 in the top plate 50 of the bale chamber. The upward stroke of the needle 14, 15 has been cross-hatched in the lowermost area in FIG. 5, from 0° up to a little over 170°. The stripping plate 63 moves to the knotting position. This displacement occurs between 25° and 65°. Previously this plate already functions in that the twine is lying on it. As a result of the displacement the upper twine 8 comes to lie on the knotterbit 24, while at the same time the lower twine 5 moves from left to right between the bows 51 and 52. The upper twine still remains positioned on the hook 61. When the needle point 14 appears, the assembly comprising the plate 55 with the twine-lock 62, the twine pulling finger 53, the twine knife 54, and the twine catcher 58 has carried out a displacement from left to right relative to the direction of travel, in these figures from the top to the bottom. (For these parts which have a direction of displacement of their own transversely to the travel or bale pressing direction, the movement whose first part has just been described will be referred to as the forward stroke, while a movement in FIGS. 5a–5f from the bottom upwards will be referred to as the return stroke.)

As a result of this forward displacement, the twine 8 has slipped from the twine catcher 58 so that it can move somewhat downward (in this case with respect to spatial reality, particularly a downward motion according to FIGS. 1 to 3 and FIG. 4). Also the upper twine 8 then comes to lie on the upper knotterbit 23. In the space between the bows the twine 8 is still located on top of the plate which forms the knife 54, but is has moved downward so far that it is now lying lower than the extremity 53' of the twine-pulling finger 53. One purpose of the forward displacement of the twine-pulling finger (with the other parts connected therewith) is to make free way for the passage of the needle in the next stage. Those other parts 53,54 and 55,57 do move but, as appears from the time diagram, this has no effect yet.

Figure 5C:
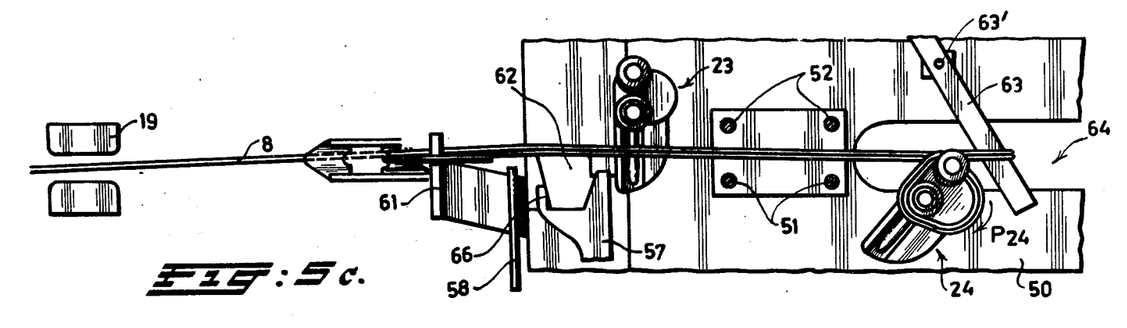

In the stage of FIG. 5c at 120° in the cycle, the needle 15 with its point 14 has come a little past the twine lock 62 and the hook 61; this is not yet the needle's extreme position. (In order to avoid obscuring the representation of the other parts in this figure, no more than an indication of the needle point 14 has been given). For this displacement the needle 15 has sufficient space between the two bows 51 and 52 and, further, it moves across the lower knotterbit 24, across the rope-pulling finger 53 and the knife 54, across the upper knotterbit 23, and across the lock 62. On the way summed, the needle point deposits the bale-enclosing twine 5; this portion of the twine which is laid next to the upper twine 8 so as to be knotted together with it finds itself of course at the lower side of the needle, while the part of the lower twine that goes back (leading to the portion 5''' in FIG. 3, the stage of which corresponds to the stage of FIG. 5c) is located at the upper side of the needle.

In the course of the last part of the needle's displacement to the stage shown in FIG. 5c the lower knotterbit 24 has become operative. Rotation of the knotterbit in the direction of the arrow P24 has commenced immediately after the lower twine has been laid down onto this knotterbit i.e. a little further than 90° in the cycle, and therefore FIG. 5c shows that the knotter 24 has performed a stroke of 180° in which the twines 5,8 have been laid jointly into an eye.

Figure 5D:
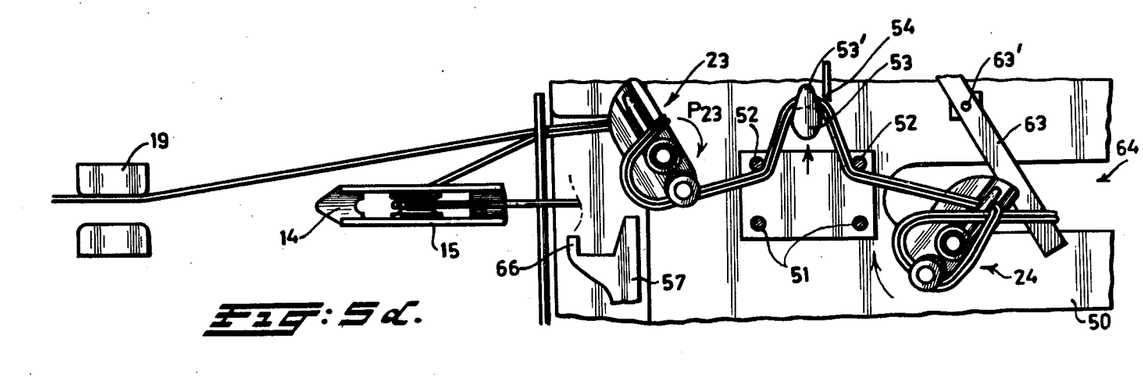

From the stage of FIG. 5c the needle can still move slightly forwardly, while shortly afterwards, at about 130° (see FIG. 5) the twine catcher 58 and the parts pertaining thereto commence their way back. The twine catcher 58 will then pass under the needle point, passing across the twines 5,8 lying next to each other. At the same time the lock 62 commences to open, as a result of which the two pieces of twine drop into the lock. The same displacement has also the result that the pieces of twine located next to each other, which are now lower than the end 53' of the twine-pulling finger are taken back by this twine-pulling finger, as is indicated by the cross-hatching for this part in the time diagram of FIG. 5, so that a certain length of these two pieces of twine, indicated by 65 in FIG. 5d, is drawn by this finger. From the drawing it will be clear that this is brought about by the presence of the two legs of the left bow 52. This extra length of the two pieces of twine is necessary in a later stage for completion of the knot. As regards the knotterbits, it will be seen that the lower bit 24 in FIG. 5d has already carried out a full stroke. At 148° in the cycle it had completed its full rotation. At the location corresponding with a stroke of about 300° the upper lip 34 of the knotterbit has, in a known manner, opened for catching the joint pieces of twine running from the bale chamber under this lip so as to form the knot.

The pieces of twine have slipped off the top of the knife.

The upper knotterbit 23, rotating in the same sense as the lower knotting bit, has performed a stroke of about 135° in which the two pieces of twine 5,8 forced into correct position in that they lie under the twine catcher 50, show the first part of the eye for the knot to be formed. FIG. 5 shows nearly the utmost position of the twine pulling finger 53 and thus the greater part of the stock of twine 65 which is available for completing the knots. Then the upper knotterbit will rotate further, and, in the known manner, the upper lip 35 will open in good time for gripping the pieces of twine running towards the bale chamber. Thus the two knots are formed mirror-symmetrically. The stack 65 of the pieces of twine 5,8 can then be used up because the twine pulling finger 53 moves forward again as soon as the upper bit 23 has moved somewhat more than 180° from its rest condition. The two pieces of twine then lie exactly in the twine lock 62 which is closed by the pin 66.

Figure 5E:
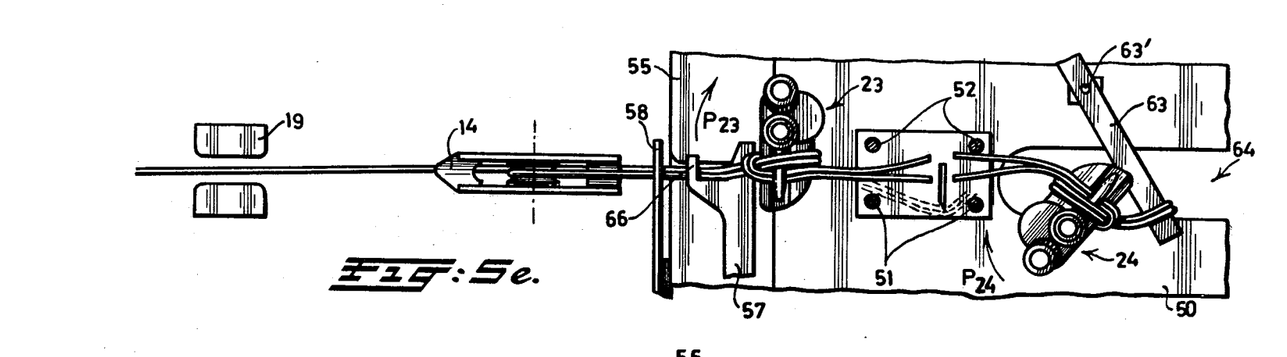

The needle returns downward during the tying of the upper know. (The downward stroke, from 171°, has not been cross-hatched in FIG. 5.) By the second forward stroke of the parts movable in transverse direction the stack of twine 65 behind the pulling finger 53 is released again and moreover the twine is placed in front of the cutting edge of the knife 54 in order to be cut (compare FIG. 5). This stage is shown in FIG. 5e. From the same figure it may be seen that the movement of the upper knotterbit 23 has now been completed. So, the two knots in unfinished condition are still on the bits waiting for the stage in which they will be drawn off, thereby, in a known manner, completing the loop knot in that the ends outside the knots (the short ends resulting from the cutting) are drawn through as a result of the hook-action of the upper lip 35.

In the stage of FIG. 5e in the first place the actual cutting of the twines 5,8 occurs in that the knife moves. In this ongoing displacement (after 216° in the cycle) the twine lock 62 will in the first place be closed entirely (see FIG. 5), the two pieces of twine inside the upper knot being held. In still further displacement of the lock plate 55 with the twine lock 62, the plate 57 will be taken along against the action of the spring 59 (compare FIG. 4), while as a result of the clamping of the pieces of twine the knot is withdrawn from the upper knotter bit 23 and thereby completed. Meanwhile, the needle 14, 15 moves back downward still further the returning undertwine 5 thereby being laid by itself over the hook 61; it is this part of the twine which in this manner already takes up the starting position of the following cycle.

After the knot has been drawn off the upper knotterbit 23, the parts movable in transverse direction can return again. The lock 62 is then opened again, whereby the upper knot made (the starting knot connecting the lower and the upper twine for the beginning of pressing the following bale) is then located approximately at the location of the twine lock 62. Only the knot will then remain in the lock (to be withdrawn later on, of itself, by the first or second press stroke in the next cycle, compare figures 1–3).

Towards the end of the return stroke of the twine-catcher etc., (from a little further than 260° in the cycle) a lever 67 becomes operative (see FIG. 5) which, with a twine-catching recess close to the hook 61, takes up the returning part of the undertwine 5, lifting it somewhat so that the twine catcher 58 may pass under it; as a result thereof this part of the twine is put beyond contact with the upper knotterbit prior to the start of the following cycle.

Also the stripping plate 63 at the lower knotterbit 24 has been brought to its stripping position (at about 280° to 320°) as a result of which the lower knot has been pushed from the lower bit 24, thus completing the loop knot such as is known per se. The loop of the lower knot may remain in the bit and will be removed by the following stroke (compare again FIG. 1-3).

Figure 5F:
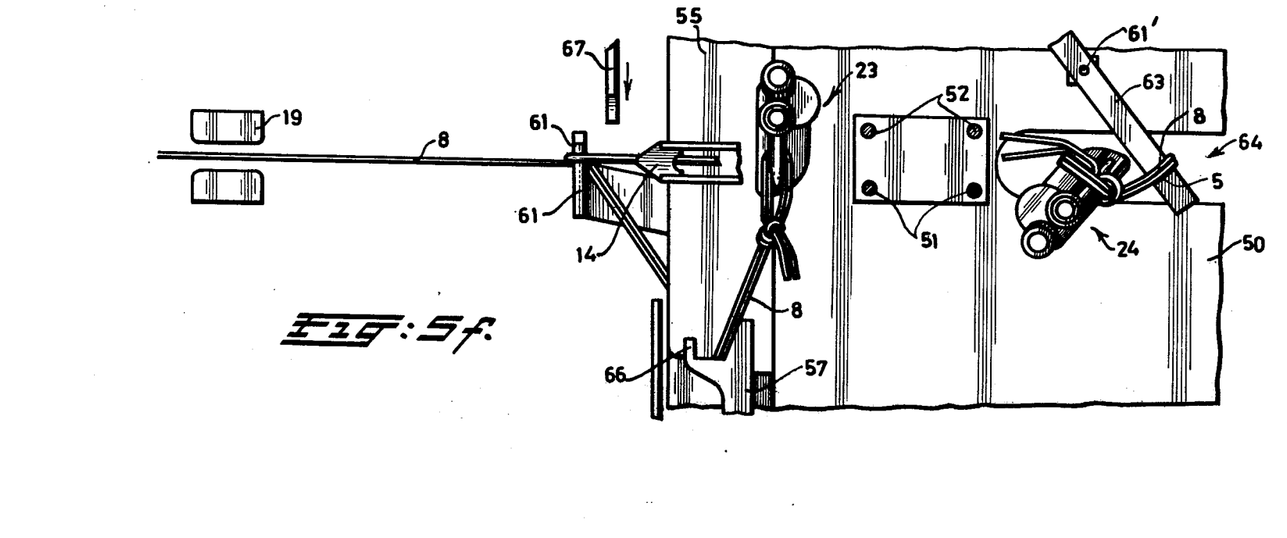

FIG. 5f shows the stage just described at over 280° on the cycle, nearly at completion of the knotting cycle, corresponding again with FIG. 5a.

In the above described knotting procedure there is reference to twine "running" from two sides. The inevitable wear resulting therefrom remains limited to two comparatively cheap parts, namely the stripping plate 63 for the lower bit 24 and the twine catcher 58 of the plate 55. The knotterbits or other parts of the knotter mechanism are not touched by the twine in the course of pressing. Since the knotting procedure described entails two-side taking up of twine and only the twine required for the top of the bale is taken up via the knotter mechanism, it may be expected that the said wear will be slight.

Further, it may be observed that, since the needle puts the bale enclosing twine directly on the lower knotterbit — and not via a retainer placed on a higher level — the lower bit may commence rotating earlier with respect to the needle and, therefore, with respect to the press plunger.

In the embodiment described the knotterbits rotate in the same sense. An opposite sense of rotation is feasible though. It would then be necessary for the knotterbits not to be identical, but symmetrical. In that case the knotterbits would be arranged in a common plane and they would be driven successively by the same toothed segment of one single driven disc. This also would imply that in such case two reversing pinions would be required for the correct sense of rotation of the upper knotterbit.

Another alternative is to drive the knotterbits from one knotter disc which would be arranged centrally on the frame of the knotting mechanism; such disc would then have to be provided with a toothed segment on either side. The frame of the knotting mechanism would require a fork-shaped cut-out in order to accomodate this disc. The mirror symmetrical arrangement of the two knotterbits would be maintained. This structure has the advantage of a shorter overall structural length but needs not necessarily be simpleror cheaper than the embodiment disclosed.

In any case it is necessary to drive the upper knotterbit by means of reversing pinions either in order to obtain the same sense of rotation when the arrangement is mirror-symmetrical or to obtain an opposite sense of rotation in case the knotterbits are arranged in one common plane.

It will be clear to the man skilled in the art of balers that the method and apparatus of this invention can be used with existing types of baling machines; these machines need not to altered, not even so in view of applying higher bale compression because most balers, as far as the structure of the press chanel, the plunger and the power are concerned, are well suitable to exert the higher pressures which are allowed now that the invention has taken away a series of limitations heretofore caused by the knotting mechanism.

What is claimed is:

1. A method arranging twine around a bale formed by pressing in the bale chamber of a baling machine by means of a press plunger, in which twine is fed from two separate bobbins, a starting knot is laid between the twine ends and the twine is arranged in the bale chamber so as to extend across the front of the bale remote from the press plunger, the bale is pressed and the twine is drawn from the bobbins during pressing so that one piece of twine comes to lie along one longitudinal side of the bale and another piece comes to lie along the opposite longitudinal side, after completion of the bale one of the said pieces of twine is carried across the back of the bale by means of a needle which performs a reciprocating movement across the back of the bale through the press plunger, and, while pressure is maintained by the press plunger, two knots are laid in both pieces of twine, one knot for tying off the bale and another knot as a starting knot for a following bale, the time period of the formation of the said other knot unit its completion overlapping the time period of the formation of the said one knot until completion thereof.

2. A method as claimed in claim 1, in which the knots are formed at locations sufficiently spaced such that, when the pieces of twine are cut between the knots during the formation of the knots, there is a sufficient length of twine to form noose type knots.

3. A method as claimed in claim 1, in which the pieces of twine are supplied to two knotters positioned one on either side of a common plane of supply, and in which the knots are formed by having the knotters rotate in the same sense.

4. Appartaus for arranging twine around a bale formed by pressing in the bale chamber of a baling machine by means of a press plunger, said baling machine comprising means for supplying two pieces of twine from separate bobbins, the apparatus comprising first and second rotary driven knotters, means driving said knotters in overlapped sequential timed relation.

5. Apparatus as claimed in claim 4, in which the axes of the first and second knotters are located on opposite sides of a said common plane of supply of the pieces of twine and are spaced apart in a direction parallel to this plane, the knotters having respective knotterbits which, when in their rest positions, at the beginning and end of each knotting cycle, are directed substantially towards the said common plane.

6. Apparatus as claimed in claim 5, in which the knotters have the same sense of rotation and, between the knotters, there is a movable finger for pulling a length of twine transversely to the same common plane.

7. Apparatus as claimed in claim 5, in which the twine pulling finger cooperates with a substantially U-shaped bow parallel to the said common plane and at one side thereof.

8. Apparatus as claimed in claim 5, in which the twine-pulling finger is movable jointly with a knife whose cutting edge is remote from the side where the twine-pulling finger engages the twine, the knife cooperating with a correspondingly shaped bow at the other side of the said common plane.

9. Apparatus as claimed in claim 4, in which on the side of the second knotter remote from the first knotter there is a stripping device in the form of a movable plate which cooperates with a plate which is provided with a lock aperture to serve as a twine lock for engaging the pieces of twine.

10. Apparatus as claimed in claim 9 in which the main direction of the bit of the second knotter is substantially perpendicular to the said common plane, and the movable plate of the twine lock is movable to and from jointly with the twine-pulling finger and the knife.

11. Apparatus as claimed in claim 9 in which the direction of the bit of the second knotter makes an angle of about 45° with the said common plane, while a twine finger is provided by way of a stripper which is driven pivotally around a rotary spindle positinned outside the said common plane and on the other side of the axis of rotation of this knotter.

12. Apparatus as claimed in claim 9 in which next to the twine lock there is a twine-catcher coupled to the movable plate thereof, which initially keeps the twine apart from the knotter bits and which furthermore assists in putting the two pieces of twine into the lock.

13. Apparatus as claimed in claim 4, in which the centerlines of both knotters are radially disposed with respect to a common knotter drive spindle.

14. Apparatus as claimed in claim 13, in which the knotters are driven by at least one disc on the knotter drive spindle, which disc, over a sector, is provided with teeth which cooperate with pinions coupled with rotary spindles of the knotter bits.

15. Apparatus as claimed in claim 13, in which two discs directed towards each other are arranged on the knotter drive spindle, each being provided with a toothed sector for a respective one of the knotters.

16. Apparatus as claimed in claim 4, in which a knotter drive spindle bears a disc with a curve which, by means of a lever transmission, controls the displacement of a twine-pulling finger, a knife, a movable plate of a twine-lock, a twine-catcher, and a stripping plate.

17. A baling machine, comprising a bale chamber with a press plunger movable therein, means to support at least two separate bobbins for the supply of twine, at least one needle to form a loop of twine around a bale formed by bringing pieces of twine from the at least two bobbins together, and one knotting mechanism for each two bobbins of twine, said knotting mechanism comprising two rotary driven knotter heads, means driving said knotting mechanisms in overlapped sequential timed relation.

* * * * *